(12) United States Patent
Okayama

(10) Patent No.: US 6,272,270 B1
(45) Date of Patent: Aug. 7, 2001

(54) OPTICAL WAVE COMBINING/SPLITTING DEVICE

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/098,603

(22) Filed: Jun. 17, 1998

(30) Foreign Application Priority Data

Jul. 11, 1997 (JP) .................................................. 9-186356

(51) Int. Cl.[7] ...................................................... G02B 6/26
(52) U.S. Cl. ............................... 385/46; 385/24; 385/37; 359/124; 359/127; 359/130
(58) Field of Search .................................. 385/46, 24, 37; 359/124, 127, 130

(56) References Cited

U.S. PATENT DOCUMENTS

| | | | |
|---|---|---|---|
| 5,339,157 | * 8/1994 | Glance | 385/46 |
| 5,461,685 | * 10/1995 | Glance | 385/46 |
| 5,488,680 | * 1/1996 | Dragone | 385/46 |
| 5,542,010 | * 7/1996 | Glance | 385/37 |
| 5,936,752 | * 8/1999 | Bishop | 359/124 |

OTHER PUBLICATIONS

Soole et al., "Passband Flattening of Arrayed Waveguide Filters" LEOS '95 Collection PD1.3, 2 pages.
U.S. application No. 09/015,617 filed Jan. 29, 1998.

* cited by examiner

*Primary Examiner*—Cassandra Spyrou
*Assistant Examiner*—Leo Boutsikaris
(74) *Attorney, Agent, or Firm*—Venable; James R. Burdett

(57) ABSTRACT

The present invention expands a selective wavelength band and flattens light intensity in the selective wavelength band as good as or better than prior art, and makes power loss less than prior art. The invention as a period characteristic wavelength splitter and an arrayed waveguide diffraction grating wavelength splitter between the first input/output port and the second input/output port in this sequence. The period characteristic wavelength splitter is comprised of the third star coupler, the second arrayed waveguide comprised of multiple waveguides having different optical path lengths, and the fourth star coupler. When an optical signal is input from the first input/output port, the period characteristic wavelength splitter outputs optical signals which wavelengths sequentially deviated with difference $\delta$ from multiple ports at the first star coupler side of the fourth star coupler. The optical signals which can be output from the multiple ports are all periodic optical signals with waveform difference $\Delta\lambda$ for any one of the ports.

10 Claims, 6 Drawing Sheets

OPTICAL WAVE COMBINING/SPLITTING DEVICE

BACKGROUND OF THE INVENTION

1. Field of the Invention

The present invention relates to an optical wave combining/splitting device that has a function to separate or demultiplex a wavelength-multiplexed optical signal into multiple optical signals in a specified selective wavelength band, and a function to combine or multiplex optical signals having various wavelengths.

2. Description of the Related Art

An example of a conventional optical wave combining/splitting device (that is, optical multiplexer/demultiplexer) is one disclosed in a document I (LEOS '95 Collection PD1.3). FIG. 6(A) shows the general configuration of the optical wave combining/splitting device disclosed in the document I. The conventional optical wave combining/splitting device comprises the first input/output port 11, a distributor 13 for distributing optical signal from the port 11, an arrayed waveguide diffraction grating wavelength splitter 15 connected to the distributor 13, and the second input/output port 17 comprised of multiple ports that is connected to the diffraction grating wavelength splitter 15. The diffraction grating wavelength splitter 15 further comprises the first star coupler 15a, the first arrayed waveguide 15b comprised of multiple waveguides having different optical path lengths, and the second star coupler 15c, which are sequentially positioned from the distributor 13 side. The distributor 13 can be implemented by a Y branching waveguide or a multi-mode waveguide.

The optical wave combining/splitting device executes optical signal separation operation when wavelength-multiplexed optical signals are input into the first input/output port 11. Among optical signals, each optical signal having a wavelength within the first selective wavelength band is output from the port 17a of the second input/output port 17, each optical signal having a wavelength within the second selective wavelength band is output from the port 17b, and each optical signal having a wavelength within the third selective wavelength band is output from the port 17c. The optical wave combining/splitting device executes wave combining operation when an optical signal in each selective wavelength band is input. The combined optical signal is output from the first input/output port 11.

In the optical wave combining/splitting device, optical signal which is input from the first input/output port 11 is broadened to $2^j$ times by the distributor 13 and is input to the first star coupler 15a. Here "j" is a positive integer. FIG. 6 indicates the case when j=1. As a consequence, optical signals in a state were the band is substantially broadened and light intensity is flat are input into the first star coupler 15a, as shown in FIG. 6 (B). Therefore a selective wavelength band of the optical signal which is output from each port of the second input/output port 17 can be broadened, and also flatness of light intensity of each output optical signal having a wavelength within the respective selective wavelength band can be improved.

With the above described conventional optical wave combining/splitting device, however, light intensity (power) of each output optical signal having a wavelength within the same selective wavelength band drops because the distributor 13 broadens the optical signal which is input from the first input/output port 11. Consequentially, excess loss of optical signals occurs causing a problem.

For example, in order to broaden a selective wavelength band of each output port to double, while keeping light intensity of each output optical signal within the band substantially the same, a method for increasing another stage in a Y branching waveguide or a method for broadening mode width of the multi-mode waveguide to double is available, but regardless what method is used, 3 dB power loss occurs. If the selective wavelength band is broadened to $2^j$ times, then j×3 dB of power loss occurs.

An object of the present invention is to provide an optical wave combining/splitting device (i.e., optical multiplexer/demultiplexer) which can implement expansion of a selective wavelength band and flattening of light intensity within the selective wavelength band as good as or better than prior art, and also has less power loss than prior art.

SUMMARY OF THE INVENTION

In accordance with a first aspect of the present invention, an optical wave combining/splitting device, that is, optical multiplexer/demultiplexer comprises the first input/output port, a period characteristic wavelength splitter that is connected to the first input/output port, a diffraction grating wavelength splitter comprised of arrayed waveguides that is connected to the above splitter, and the second input/output port comprised of multiple ports that is connected to the diffraction grating wavelength splitter. The diffraction grating wavelength splitter comprises the first star coupler, the first arrayed waveguide comprised of multiple waveguides having different optical path lengths, and the second star coupler, which are sequentially positioned from the period characteristic wavelength splitter side.

The period characteristic wavelength splitter comprises the third star coupler that is connected to the first input/output port, the second waveguide array comprised of multiple waveguides having different optical path lengths that is connected to the third star coupler, and the fourth star coupler of which one end is connected to the second arrayed waveguide and the other end is connected to the first star coupler. When optical signal is input from the first input/output port to the period characteristic wavelength splitter, separate optical signals which wavelengths are sequentially deviated with difference δ are output from the multiple ports at the first star coupler side of the fourth star coupler respectively, and periodic optical signals with wavelength difference Δλ are output from any one of the ports.

Functions of the optical wave combining/splitting device of the invention are now described using concrete examples. In this example, an optical signal whose central wavelength is $\lambda_0$ is input to the first input/output port of the optical wave combining/splitting device of the invention as a wavelength-multiplexed optical signal, which includes each optical signal of $\lambda_1$, $\lambda_2$, $\lambda_3$ and $\lambda_4$ which wavelengths are sequentially deviated with the first wavelength interval δ, and optical signal $\lambda_5$ which wavelength is deviated from $\lambda_1$ with the second wavelength interval Δλ, optical signal $\lambda_6$ which wavelength is deviated from $\lambda_2$ with Δλ, optical signal $\lambda_7$ which wavelength is deviated from $\lambda_3$ with Δλ, and optical signal $\lambda_8$ which wavelength is deviated from $\lambda_4$ with Δλ.

When this optical signal is input from the first input/output port to the period characteristic wavelength splitter, the period characteristic wavelength splitter outputs a set of optical signals having wavelength difference Δλ from each port at the first star coupler side of the fourth star coupler using its function. In this configuration example, a set of optical signals, $\lambda_1$ and $\lambda_5$, is output from one port, a set of optical signals $\lambda_2$ and $\lambda_6$ from another port, a set of optical signals $\lambda_3$ and $\lambda_7$ from another port, and a set of optical signals $\lambda_4$ and $\lambda_8$ from another port (the wavelength is split or demuliplexed).

Since the period characteristic wavelength splitter is a splitter using a star coupler, each optical signal $\lambda_1$~$\lambda_8$ which was split as above is an optical signal which substantially maintains the peak level of the optical power when the optical signal was input to the first input/output port.

$\lambda_1$~$\lambda_4$, which were separated as above by the period characteristic wavelength splitter, are combined or multiplexed by the diffraction grating wavelength splitter which is comprised of arrayed waveguides (details are described later). As a result, an optical signal in the first selective wavelength band, including $\lambda_1$~$\lambda_4$, is output from a port in the second input/output port. $\lambda_5$~$\lambda_8$ are also combined or multiplexed by the arrayed waveguide diffraction grating wavelength splitter. As a result, an optical signal in the second selective wavelength band, including $\lambda_5$~$\lambda_8$, is output from another port in the second input/output port. As a consequence, according to the optical wave combining/splitting device of the invention, input optical signals which central wavelength is $\lambda_0$, including optical signals $\lambda_1$~$\lambda_8$, are split or demuliplexed and an optical signal which selective wavelength band is $\lambda_1$~$\lambda_4$, and an optical signal which selective wavelength band is $\lambda_5$~$\lambda_8$ are output as output optical signals.

Here, each optical signal, $\lambda_1$~$\lambda_8$, is an optical signal which substantially maintains the peak level of the optical power when the optical signal is input to the first input/output port, as described above, therefore each optical signal which selective wavelength band is $\lambda_1$~$\lambda_4$, and optical signal which selective wavelength band is $\lambda_5$~$\lambda_8$, substantially has the same power as at input time.

If power of optical signals with wavelength $\lambda_1$~$\lambda_4$ to determine a selective wavelength band is assumed to be similar, then flatness of light intensity in the selective wavelength band gets better as the value $\delta$ becomes smaller in the selective wavelength band. This is because the number of wavelengths that can be included in the selective wavelength band increases as $\delta$ becomes smaller. Width of a selective wavelength band can be determined by the product of above $\delta$ and the number of split wavelengths of the period characteristic wavelength splitter (Q), that is by $\delta \cdot Q$.

Wave combining operation, on the other hand, is opposite of the wave splitting operation described above.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
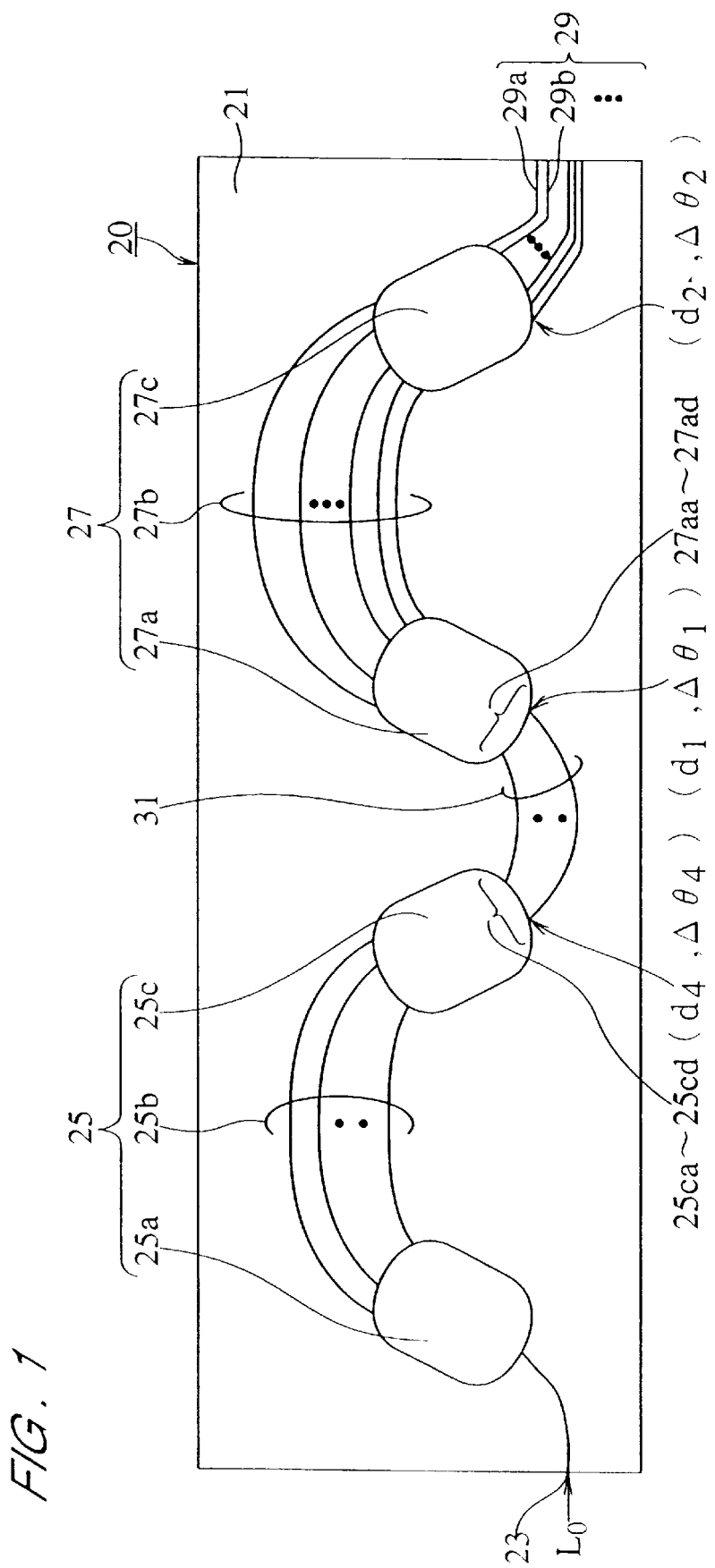
FIG. 1 is a top view depicting the configuration of an embodiment of an optical wave combining/splitting device of the present invention.

Referring now to the drawings, an embodiment of an optical wave combining/splitting device of the present invention is described. Each of the drawings used for the explanation merely indicate general size, shape and configuration of each component. In each drawing, the same numbers are assigned to similar components, for which explanation is omitted to avoid redundancy.

Figure 2:
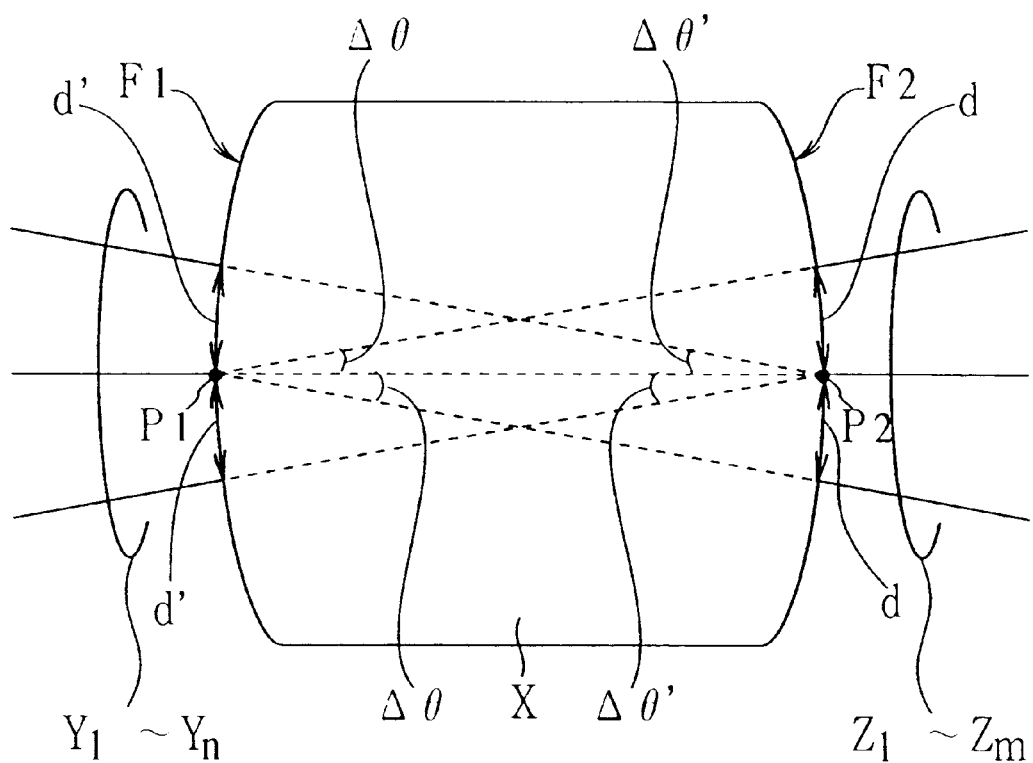
FIG. 2 is a diagram depicting basic structure of each star coupler (first~fourth star coupler) which are used for the optical wave combining/splitting device of the present invention.
Figure 3A:
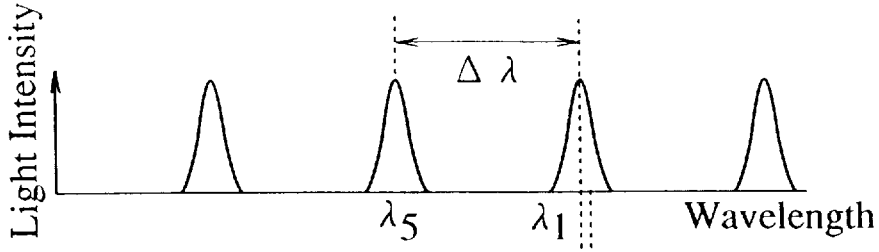
FIG. 3, including FIGS. 3 (A) to 3 (E), is diagrams depicting wavelength difference $\Delta\lambda$ and wavelength deviation $\delta$, and depicting operation of the embodiment of the optical wave combining/splitting device.
Figure 3B:
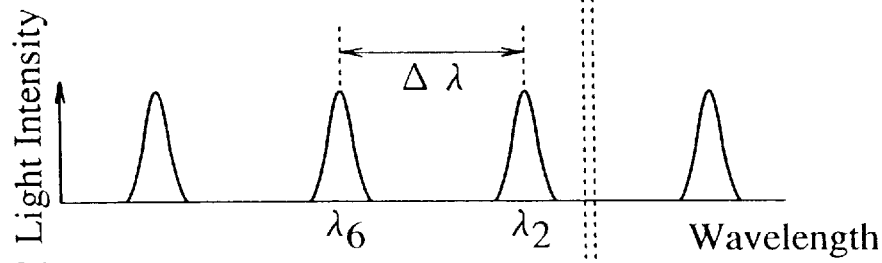
Figure 3C:
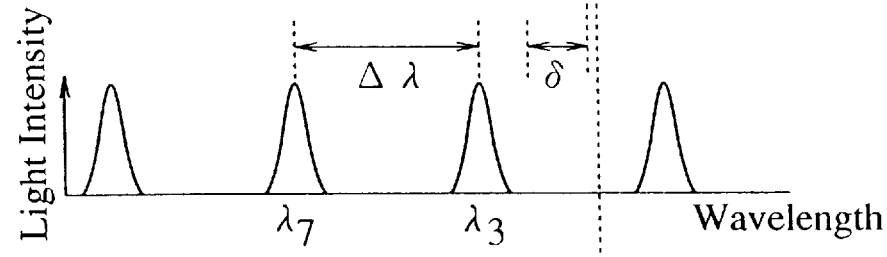
Figure 3D:
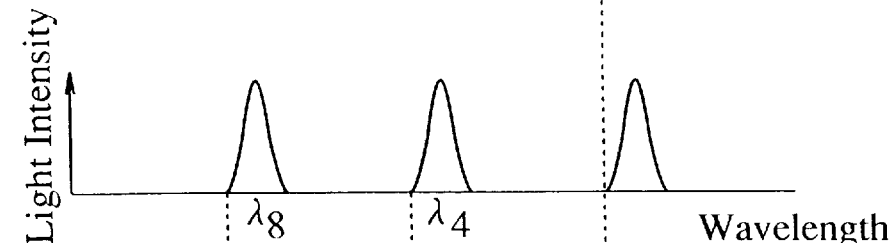
Figure 3E:
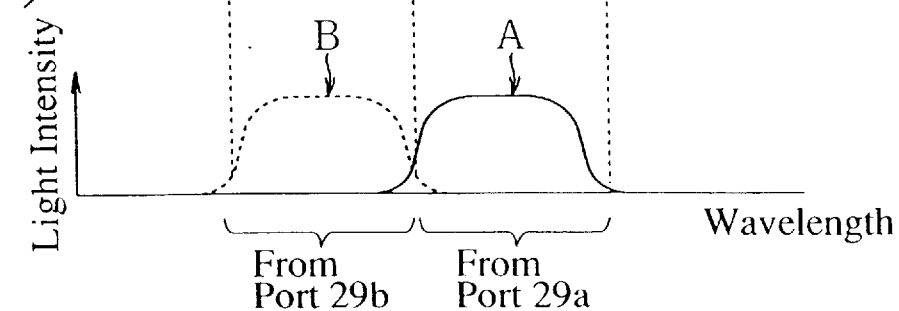

Referring to FIG. 1 to FIG. 3, configuration of the optical wave combining/splitting device of the embodiment is described first. Here, FIG. 1 is a top view depicting the optical wave combining/splitting device, that is, optical multiplexer/demultiplexer 20 of the embodiment in general. FIG. 2 is a top view of the key sections depicting basic structure of the first to fourth star couplers. FIG. 3 is a diagram depicting functions of a period characteristic wavelength splitter (or demultiplexer) 25 and an arrayed waveguide diffraction grating wavelength splitter (or demultiplexer) 27 respectively.

The optical wave combining/splitting device 20 comprises the first input/output port 23, the period characteristic wavelength splitter 25, the diffraction grating wavelength splitter 27 which is comprised of arrayed waveguides, and the second input/output port 29, and these components are created on substrate (or board) 21 in this sequence.

The substrate 21 can be made of an appropriate substrate or board where a two-dimensional waveguide structure and a three-dimensional waveguide structure can be created, such as a compound semiconductor substrate, glass substrate or polymer substrate.

There is only one first input/output port 23 here. However, two or more ports can be used depending on the relationship with the third star coupler 25a, as described below.

The arrayed waveguide diffraction grating wavelength splitter 27 comprises the first star coupler 27a, the first arrayed waveguide 27b consisting of multiple waveguides having different optical path lengths, that is connected to the first star coupler 27a, and the second star coupler 27c of which one end is connected to the arrayed waveguide 27b and the other end is connected to the second input/output waveguide 29.

The period characteristic wavelength splitter 25 comprises the third star coupler 25a which is connected to the first input/output port 23, the second arrayed waveguide 25b consisting of multiple waveguides having different optical path lengths that is connected to the third star coupler 25a, and the fourth star coupler 25c of which one end is connected to the second arrayed waveguide 25b and the other end is connected to the first star coupler 27a. The fourth star coupler 25c and the first star 27a are connected with a connecting waveguide 31.

In the first to fourth star coupler 27a, 27c, 25a and 25c, the number of waveguides to be connected to each star coupler (number of ports), space between the waveguides to be connected, and angle formed by adjacent waveguides are set to optimum values, as described below.

All of the first to the fourth star coupler 27a, 27c, 25a and 25c, basically include a plane waveguide X which has the first end face F1 and the second end face F2, each of which has a respective curvature, as shown in FIG. 2, and waveguides $Y_1$~$Y_n$ are connected to the first end face F1 and waveguides $Z_1$~$Z_m$ are connected to the second end face F2.

In this configuration example, the waveguides $Y_1 \sim Y_n$ and the waveguides $Z_1 \sim Z_m$ are connected to the plane waveguide X as follows.

Assume that the page face of FIG. 2 is a plane that meets perpendicular to the first end face F1 and the second end face F2. On this plane, an arbitrary reference point is set at the plane waveguide X side from the first end face F1. For example, a reference point P2 is set on the second end face F2. Then multiple lines, three lines (indicated by the broken lines in FIG. 2) for example, radially stretch from the reference point P2 to the first end face F1 side, with equal angle spacing assumed. The waveguides $Y_1 \sim Y_n$ are connected to the plane waveguide X at the intersections between these lines and the first end face F1. Also, an arbitrary reference point is set at the plane waveguide X side from the second end face F2. For example, a reference point P1 is set on the first end face F1. Then multiple lines, three lines (indicated by the broken lines in FIG. 2, the center broken line is a common broken line) for example, radially stretch from the reference point P1 to the second end face F2 side, with equal angle spacing assumed. The waveguides $Z_1 \sim Z_m$ are connected to the plane waveguide X at the intersections between these lines and the second end face F2.

These waveguides $Y_1 \sim Y_n$ and $Z_1 \sim Z_m$ can actually be waveguides of the first arrayed waveguide 27b, connecting waveguide 31, waveguides of the second arrayed waveguide 25b, or waveguides reaching the second input/output port 29.

In the following detailed description on the first to fourth star couplers, such parameters as waveguide spacing and angle formed by adjacent waveguides will be used, where the spacing of waveguides is a spacing corresponding to "d" in FIG. 2, and the angle formed by adjacent waveguides is an angle corresponding to "$\Delta\theta$" in FIG. 2. The d and $\Delta\theta$ generally vary depending on the first to the fourth star coupler, and depending whether the end face to which the waveguide is connected is the first end face F1 or the second end face F2. In the following description, the difference will be indicated by adding a subscript to d and $\Delta\theta$ (e.g. $d_1$, $\Delta\theta_1$). d' and $\theta$' in FIG. 2 are determined according to the design, in some cases d'=d and $\Delta\theta'=\Delta\theta$, and in other cases d'$\neq$d and $\Delta\theta'\neq\Delta\theta$.

In the period characteristic wavelength splitter or demultiplexer 25, a wavelength-multiplexed optical signal is input from the first input/output port 23. Then from multiple ports (in this example, 4 ports: 25ca~25cd) at the first star coupler 27a side of the fourth star coupler 25c, the wave splitter 25 outputs optical signals which wavelengths among the ports sequentially differ with the first wavelength spacing $\delta$. Optical signals that can be output from the ports 25ca~25cd of the wave splitter 25 are periodic optical signals with wavelength difference $\Delta\lambda$, that is the second wavelength spacing, for any one of the ports.

In the arrayed waveguide diffraction grating wavelength splitter or demultiplexer 27, a set of optical signals which wavelengths are sequentially deviated with $\delta$ and a set of optical signals which wavelengths are periodically deviated with $\Delta\lambda$ from the above set of optical signals are input from the fourth star coupler 25c to the first star coupler 27a. And the wave splitter (demultiplexer) outputs these sets of optical signals to the multiple ports of the second input/output port 29 in the set units without overlapping.

The wavelength difference $\Delta\lambda$ and wavelengths deviation $\delta$ are now described referring to FIG. 3 to deepen understanding of this concept. In FIGS. 3 (A)~(D), the abscissa indicates wavelength, and the ordinate indicates light intensity. Wavelength-multiplexed optical signals which central wavelength is $\lambda_0$ are input to the first input/output port 23. The optical signals include optical signals which wavelengths are not the above mentioned wavelengths $\lambda_1 \sim \lambda_8$. In this case, optical signals are output from the ports 25ca~25cd at the first star coupler side of the fourth star coupler 25c of the period characteristic wavelength splitter 25 respectively, as shown in FIGS. 3 (A)~(D). This means that the optical signals which are output from the port 25ca are the optical signal with wavelength $\lambda_1$, the optical signal with wavelength $\lambda_5$ which has $\Delta\lambda$ of wavelength difference from the optical signal with wavelength $\lambda_1$, and the optical signals which have $\Delta\lambda$ of wavelength difference sequentially, as shown in FIG. 3 (A). The optical signals which are output from the port 25cb are the optical signal with wavelength $\lambda_2$, the optical signal with wavelength $\lambda_6$ which has $\Delta\lambda$ of wavelength difference from the optical signal with wavelength $\lambda_2$, and the optical signals which have $\Delta\lambda$ of wavelength difference sequentially, as shown in FIG. 3 (B). The optical signals which are output from the port 25cc are the optical signal with wavelength $\lambda_3$, the optical signal with wavelength $\lambda_7$ which has $\Delta\lambda$ of wavelength difference from the optical signal with wavelength $\lambda_3$, and the optical signals which have $\Delta\lambda$ of wavelength difference sequentially, as shown in FIG. 3 (C). The optical signals which are output from the port 25cd are the optical signal with wavelength $\lambda_4$, the optical signal with wavelength $\lambda_8$ which has $\Delta\lambda$ of wavelength difference from the optical signal with waveform $\lambda_4$, and the optical signals which have $\Delta\lambda$ of wavelength difference sequentially, as shown in FIG. 3 (D).

Also wavelengths of the optical signals among the ports 25ca, 25cb, 25cc and 25cd are deviated with $\delta$ in the specified sequence of the ports.

The arrayed waveguide diffraction grating wavelength splitter 27, on the other hand, combines a set of optical signals, optical signals with wavelength $\lambda_1 \sim \lambda_4$ for example, among the optical signals that are output from each port 25ca~25cd of the fourth star coupler 25c, and outputs it to a port of the second input/output port 29, the port 29a for example. The wave splitter 27 also combines a set of optical signals with wavelengths $\lambda_5 \sim \lambda_8$ among the optical signals that are output from each port 25ca~25cd of the fourth star coupler 25c, and outputs it to a port of the second input/output port 29, the port 29b for example. Then a set of optical signals with the next wavelengths is sequentially output to another port of the second input/output port 29 without overlapping (FIG. 3 (E)).

To implement the above function, the period characteristic wavelength splitter 25 and arrayed waveguide diffraction grating wavelength splitter 27 of the embodiment are designed as follows, for example.

The third start coupler 25a is a star coupler that has P inputs and 2Q outputs. The second arrayed waveguide 25b is an arrayed waveguide consisting of 2Q waveguide channels. The fourth star coupler 25c is a star coupler that has 2Q inputs and Q outputs. The first star coupler 27a is a star coupler that has Q inputs x 2Q·N outputs. The first arrayed waveguide 25b is an arrayed waveguide consisting of 2Q×N waveguides. And the second star coupler 25c is a star coupler that has 2Q·N inputs and N outputs.

Here, P is "1" or a greater integer, Q is "2" or a greater integer which is an integer that satisfies $\Delta\lambda=Q\delta$ for the $\Delta\lambda$ and $\delta$, and N is a number of ports of the second input/output port. The number of ports of the first input/output port 23 is "1" in FIG. 1, but it is also acceptable that the number of the first input/output ports be "2" or more, and the number of ports P of the third star coupler 25a is the same as the number of ports of the first input/output port 23.

The above described wavelength difference $\Delta\lambda$ of the period characteristic wavelength splitter 25 is given by $\Delta\lambda=\lambda_0^2/(2\,n_{A2}\,\Delta L_{A2})\ldots(1)$, where $\Delta L_{A2}$ is the optical path length difference between adjacent waveguides of the second arrayed waveguide 25b, $n_{A2}$ is the effective refractive index of the second arrayed waveguide 25b, and $\lambda_0$ is the central wavelength of the optical signals to be used (wavelength-multiplexed optical signal).

The above described $\delta$ is given by $\delta=n_{S4}\,d_4\,\Delta\theta_4/m_4\ldots(2)$, where $n_{S4}$ is the refractive index of the fourth star coupler 25c, $d_4$ is waveguide spacing of the fourth star coupler side of the connecting waveguide 31, $\Delta\theta_4$ is an angle formed by adjacent waveguides at the fourth star coupler side of the connecting waveguide 31, and $m_4$ is an order of interference and is given by $m_4=2n_{A2}\,\Delta L_{A2}/\lambda_0$.

Therefore, these $\Delta L_{A2}$, $n_{A2}$, $n_{S4}$ and $d_4$ are determined according to $\delta$ and $\Delta\lambda$.

The connection condition of the connecting waveguide 31 to the first star coupler 27a is that a same wavelength deviation $\delta$ as the above wavelength deviation $\delta$ in the period characteristic wavelength splitter 25 is generated in the first star coupler 27a as well. When the refractive index of the first star coupler 27a is $n_{S1}$, the waveguide spacing at the first star coupler 27a side of the connecting waveguide 31 is $d_1$, and the angle formed by the adjacent waveguides is $\Delta\theta_1$, the wavelength deviation $\delta$ is given by $\delta=n_{S1}\,d_1\,\Delta\theta_1/m_2\ldots(3)$. Here $m_2$ is an order of interference and is given by $m_2=2n_{A1}\,\Delta L_{A1}/\lambda_0$. $n_{A1}$ is the refractive index of the first arrayed waveguide 27b, and $\Delta L_{A1}$ is an optical path length difference of adjacent waveguides of the first arrayed waveguide 27b. Therefore these $n_{S1}$, $d_1$ and $\Delta\theta_1$ are determined so as to satisfy the above formula (3).

The same wavelength difference $\Delta\lambda$ as the above wavelength difference $\Delta\lambda$ in the period characteristic wavelength splitter 25 must also be generated in the arrayed waveguide diffraction grating wavelength splitter 27. When the refractive index of the second star coupler 27c is $n_{S2}$, the waveguide spacing at the second star coupler side of the first arrayed waveguide 27b is $d_2$, and the angle formed by the adjacent waveguides is $\Delta\theta_2$, the wavelength difference $\Delta\lambda$ is given by $\Delta\lambda=n_{S2}\,d_2\,\Delta\theta_2/m_2\ldots(4)$. Therefore these $n_{S2}$, $d_2$ and $\Delta\theta_2$ are determined so as to satisfy the above formula (4).

As a consequence, if $\Delta\lambda=Q\delta$, then $n_{S2}\,d_2\,\Delta\theta_2/n_{S1}\,d_1\,\Delta\theta_1=Q$.

Operation of the optical wave combining/splitting device, that is, optical multiplexer/demultiplexer 20 of the present embodiment is described next. At first, an example where the wavelength-multiplexed optical signal $L_0$ which central wavelength is $\lambda_0$ is input from the first input/output port 23 for splitting or demultiplexing the optical signal $L_0$ is described.

The optical signal $L_0$ which is input to the first input/output port 23 enters the third star coupler 25a. This optical signal is distributed by the third star coupler 25a, then enters into each waveguide of the second arrayed waveguide 25b, and finally enters the fourth star coupler 25c.

Figure 4:
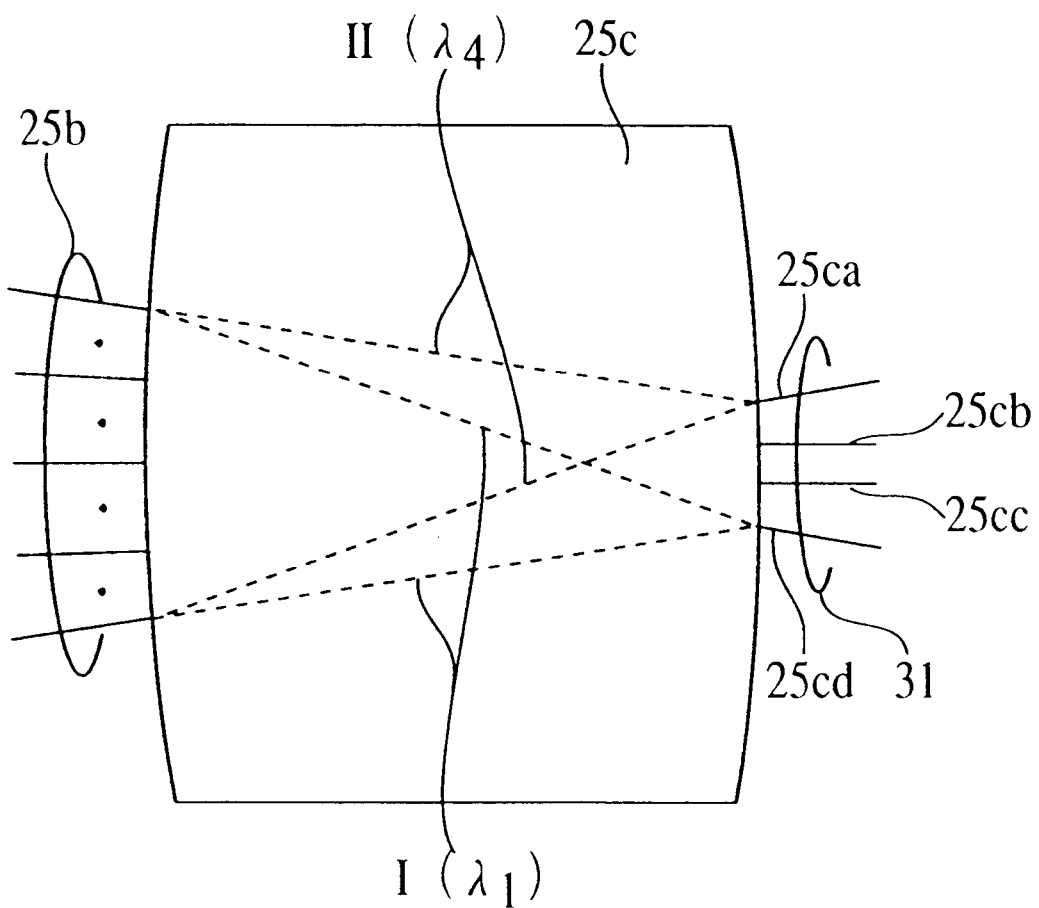
FIG. 4 is a diagram depicting functions of the third star coupler, and an enlarged view of the third star coupler and its peripheral area.

Now referring to FIG. 4, functions of the fourth star coupler 25c are described. FIG. 4 is an enlarged view of the fourth star coupler 25c and its peripheral area.

Each waveguide of the second arrayed waveguide 25b has different optical path lengths, therefore phases of optical signal entered from each waveguide of the second arrayed waveguide 25b to the fourth star coupler 25c are all deviated. This makes the optical signals entered from the second arrayed waveguide 25b to the fourth star coupler 25c interfere with each other, and are condensed to specific focal points depending on the wavelength. Since the amount of deviation of the phase depends on the wavelength of the optical signal, each optical signal having wavelength $\lambda_1$~$\lambda_4$ of the optical signal $L_0$, for example, condenses to a different focal point from each other. In FIG. 4, condensing status of the optical signals with wavelength $\lambda_1$ and $\lambda_4$ is indicated by the dotted line I for the former, and the dotted line II for the latter.

The connecting waveguide 31 is placed at the focal points where each optical signal with wavelength $\lambda_1$~$\lambda_4$ condenses. As a consequence, the optical signals with wavelengths $\lambda_1$~$\lambda_4$ are input to the first star coupler 27a by way of a different waveguide of the connecting waveguide 31.

As clarified in the above description, each optical signal with wavelength $\lambda_1$~$\lambda_4$ of the optical signal $L_0$ is distributed by the third star coupler 25a, and is combined again by the fourth star coupler 25c. Therefore each optical signal with wavelength $\lambda_1$~$\lambda_4$ which was output from the fourth star coupler 25c substantially maintains the power when it was input to the first input/output port 23.

Each optical signal with wavelength $\lambda_5$~$\lambda_8$ of the optical signal $L_0$ is also output to the ports 25ca~25cd at the first star coupler 27a side of the fourth star coupler 25c due to the same reason as above. Optical signals having periodic wavelength with wavelength difference $\Delta\lambda$ are also output to the ports 25ca~25cd at the first star coupler 27a side of the fourth star coupler 25c. FIG. 3 shows this status.

The optical signals which are output to the ports 25ca~25cd at the first star coupler 27a of the fourth star coupler 25c are combined by the arrayed waveguide diffraction grating wavelength splitter 27 for each set of wavelengths with wavelength deviation $\delta$. Concretely, each optical signal with wavelength $\lambda_1$~$\lambda_4$ is distributed by the first star coupler 27a, and then transits through each wavelength of the first arrayed waveguide 27b. Then each optical signal with wavelength $\lambda_1$~$\lambda_4$ is condensed to one port at the second input/output port 29 side of the second star coupler 27c. Because of this, a combined optical signal of the optical signals with wavelength $\lambda_1$~$\lambda_4$, that is, an optical signal in the selective wavelength band A including wavelength $\lambda_1$~$\lambda_4$, is output from the port 29a, for example, of the second input/output port 29. Optical signals with wavelength $\lambda_5$~$\lambda_8$ are condensed to another port at the second input/output port 29 side of the second star coupler 27c due to the same reasons as the above case of $\lambda_1$~$\lambda_4$. Because of this, the combined optical signal, that is, an optical signal in the selective wavelength band B including wavelength $\lambda_5$~$\lambda_8$, is output from the port 29b, for example, of the second input/output port 29.

The optical signal in the selective wavelength band A is a composite optical signal of optical signals $\lambda_1$~$\lambda_4$ where wavelengths are sequentially deviated with $\delta$, therefore the optical signal has approximately $|\lambda_1-\lambda_4|$ of bandwidth and an output characteristic which is a combination of light intensity distribution of each optical signal with wavelength $\lambda_1$~$\lambda_4$. Each output optical signal maintains power of the input optical signal, therefore output characteristic of the optical signal in the selective wavelength band A becomes substantially flat (FIG. 3 (E)).

The optical signal in the selective wavelength band A is a composite optical signal of optical signals $\lambda_5$~$\lambda_8$ where wavelengths are sequentially divided with δ, therefore the optical signal has approximately $|\lambda_5-\lambda_8|$ of bandwidth and an output characteristic which is a combination of light intensity distribution of each optical signal with wavelength $\lambda_5\sim\lambda_8$. Each output optical signal, in this case too, maintains power of the input optical signal, therefore output characteristic of the optical signal in the selective wavelength band B becomes substantially flat (FIG. 3 (E)).

Here, a selective wavelength band is determined by the product of the number of ports Q at the first star coupler 27a side of the fourth star coupler 25c and above mentioned waveform deviation δ. If the peak of the light intensity of optical signals with wavelength $\lambda_1\sim\lambda_8$ is about the same, then the flatness of light intensity in the selective wavelength band becomes better as the wavelength deviation δ is smaller.

As a consequence, the present invention can expand a selective wavelength band and flatten the light intensity in the selective wavelength band as good as or better than prior art, and implements the optical wave combining/splitting (or multiplexing/demultiplexing) device which power loss is less than prior art.

Wave combining (or multiplexing) operation of the optical wave combining/splitting device is performed based on the principle that is the reverse of the above mentioned wave splitting (or demultiplexing) operation. For example, an optical signal which includes wavelength $\lambda_1\sim\lambda_4$ (such as an optical signal which selective wavelength band is A shown in FIG. 3 (E)) is input from the port 29a of the second input/output port 29, and an optical signal which includes wavelength $\lambda_5\sim\lambda_8$ (such as an optical signal which selective wavelength band is B shown in FIG. 3 (E)) is input from the port 29b of the second input/output port 29. Then $\lambda_1$ and $\lambda_5$ are output to the port 27aa at the fourth star coupler 25c side of the first star coupler 27a, $\lambda_2$ and $\lambda_6$ to the port 27ab, $\lambda_3$ and $\lambda_7$ to the port 27ac, and $\lambda_4$ and $\lambda_8$ to the port 27ad. This means that optical signals are output to the ports 27aa~27ad in the state corresponding to the port 25ca~port 25cd in FIG. 3. These optical signals are combined or multiplexed by the period characteristic wavelength splitter 25. As a result, composite optical signal with wavelength $\lambda_1\sim\lambda_8$ is output from the first input/output port 23.

The present invention is not limited to the above mentioned embodiment, and many modifications and variant forms are possible.

Figure 5:
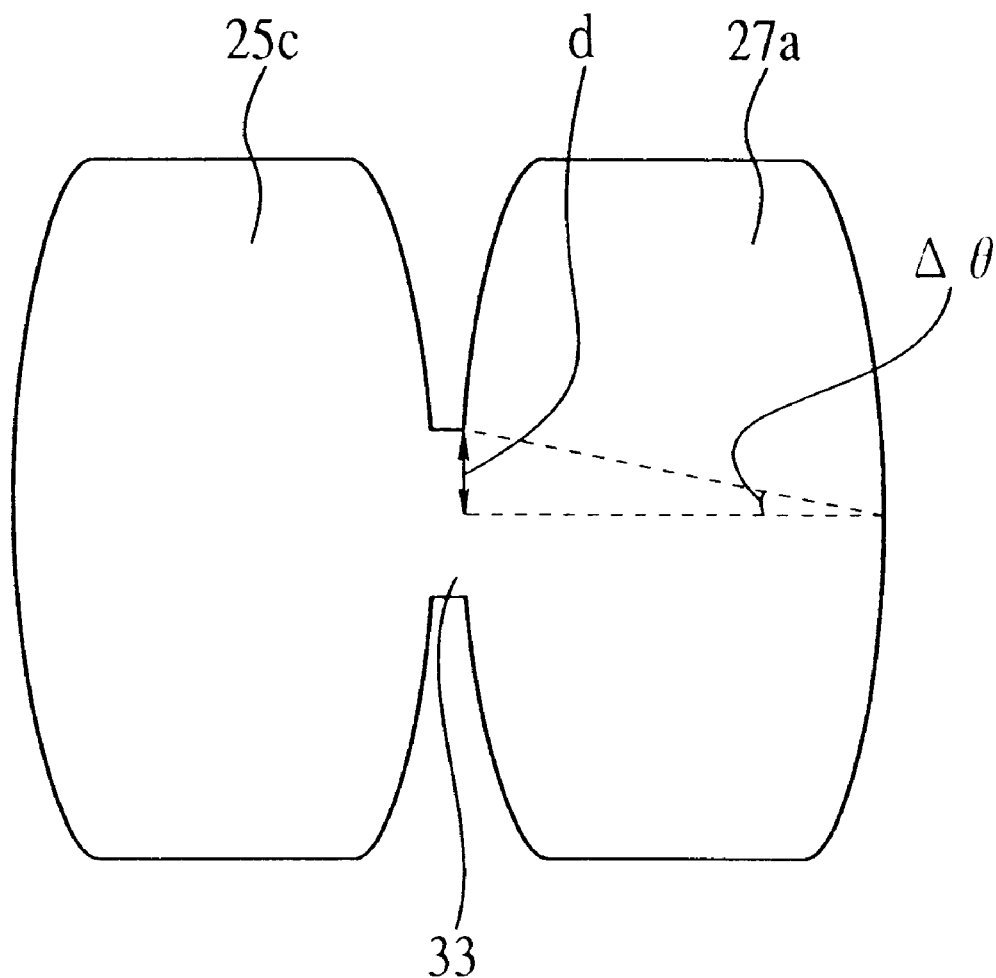
FIG. 5 is a diagram depicting another preferred embodiment of an optical wave combining/splitting device of the invention.
Figure 6A:
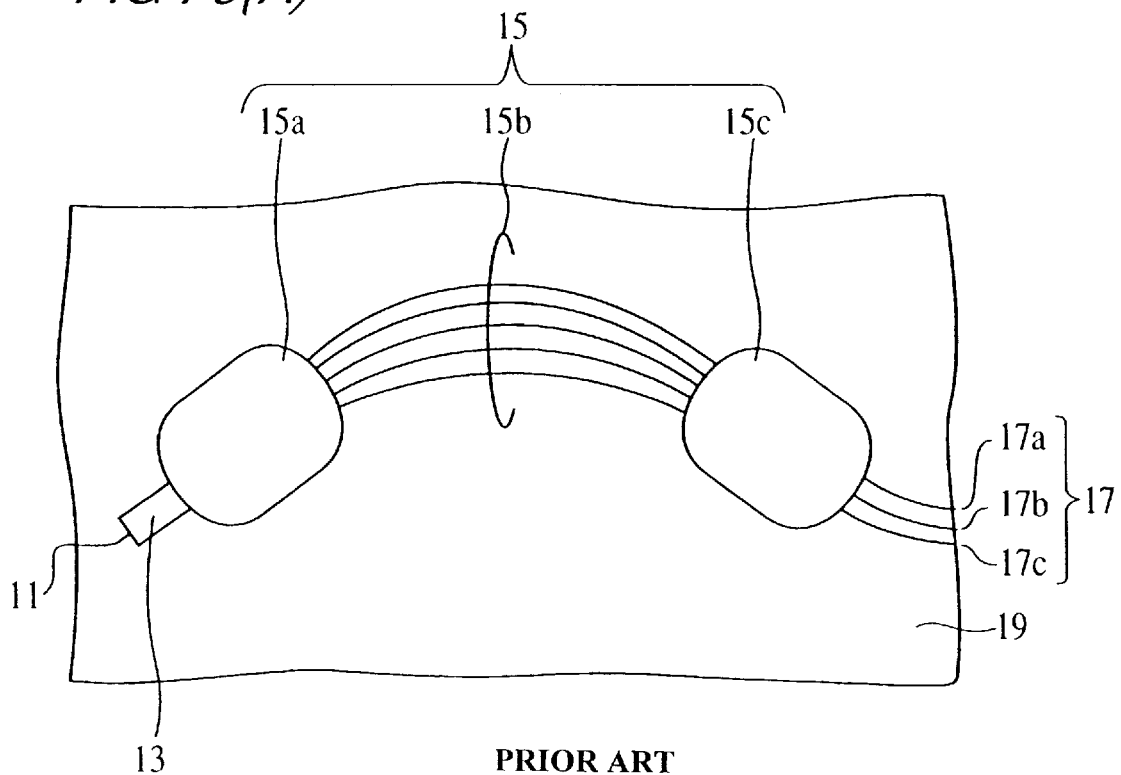
FIG. 6 (A) and FIG. 6 (B) are diagrams depicting a prior art and its problems.
Figure 6B:
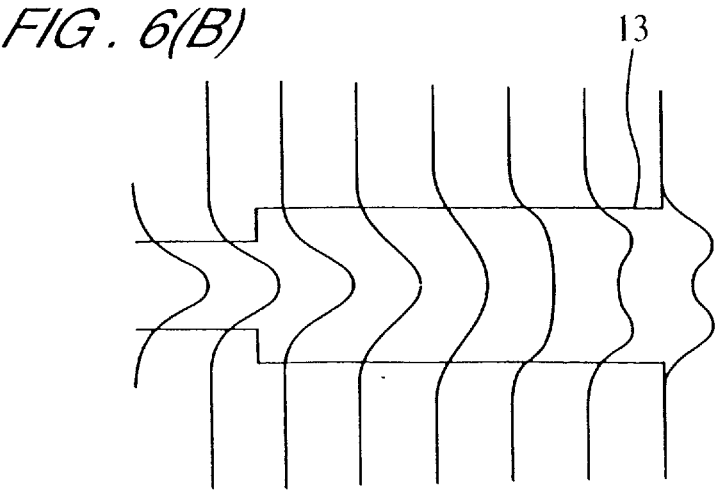

For example, in the above mentioned embodiment, the fourth star coupler 25c and the first star coupler 27a are connected with the connecting waveguide 31 that has a three-dimensional waveguide structure. However, as FIG. 5 shows, it is also possible to position the fourth star coupler 25c and the first star coupler 27a closer to each other, so that the star couplers 25c and 27a can be connected with a slab waveguide 33 which has a shorter length than the connecting waveguide 31. In this case, the slab waveguide 33 implements the above functions of the connecting waveguide 31. In the case of this embodiment, the length of the connecting waveguide 31 is shortened, which will allow downsizing of the optical wave combining/splitting (or multiplexing/ demultiplexing) device.

As described above, in the optical wave combining/ splitting device of the present invention, if a wavelength-multiplexed optical signal is input from the first input/output port, then the period characteristic wavelength splitter outputs a set of optical signals that have wavelengths with wavelength deviation δ (e.g. $\lambda_1\sim\lambda_4$) from multiple ports at the arrayed waveguide diffraction grating wavelength splitter side. The period characteristic wavelength splitter also outputs another set of optical signals that have other wavelengths which wavelengths are sequentially deviated from the above mentioned set of optical signals respectively with wavelength difference Δλ (e.g. $\lambda_5\sim\lambda_8$, . . . ,) from the multiple ports. The arrayed waveguide diffraction grating wavelength splitter combines these optical signals for each set of wavelengths, then outputs the composite optical signal from the second input/output port of the optical wave combining/splitting device. Consequently, among the wavelength-multiplexed optical signal, an optical signal in a selective wavelength band which is specified by the above set of wavelengths is output from the optical wave combining/splitting device respectively as split optical signals.

Here, a selective wavelength band is determined by the number of wavelengths included in the set of wavelengths. Flatness of light intensity in the selective wavelength band is determined by the product of the number of wavelengths included in the set of wavelengths and the wavelength deviation δ. Since the period characteristic wavelength splitter is a wave splitter that uses star couplers, an optical signal with each wavelength, including the set of wavelengths, is an optical signal that substantially maintains the peak level of light intensity when the optical signal is input to the first input/output port.

It is apparent that the present invention, as described above, can expand a selective wavelength band and flatten light intensity in the selected wavelength band as good as or better than prior art, and can implement an optical wave combining/splitting device which power loss is less than prior art.

What is claimed is:

1. An optical wave combining/splitting device comprising:
   a first input/output port;
   a period characteristic wavelength splitter that is connected to the first input/output port;
   a diffraction grating wavelength splitter comprised of arrayed waveguides that is connected to the period characteristic wavelength splitter; and
   a second input/output port comprised of multiple ports that is connected to the diffraction grating wavelength splitter,
   wherein said diffraction grating wavelength splitter further comprises:
      a first star coupler;
      a first arrayed waveguide comprised of multiple waveguides having different optical path lengths; and
      a second star coupler;
      which are sequentially positioned from said period characteristic wavelength splitter side, and
   said period characteristic wavelength splitter further comprising:
      a third star coupler that is connected to said first input/output port;
      a second arrayed waveguide comprised of multiple waveguides having different optical path lengths that is connected to said third star coupler; and
      a fourth star coupler of which one end is connected to said second arrayed waveguide and the other end is connected to said first star coupler, and
   when optical signal is input from said first input/output port to the period characteristic wavelength splitter, separate optical signals whose wavelengths are sequentially deviated with difference δ are output from the multiple ports at said first star coupler side of said fourth star coupler, and periodic optical signals whose wavelengths differ by Δλ are output from each of the multiple ports of said first star coupler side of said fourth star coupler.

2. The optical wave combining/splitting device according to claim 1, wherein said arrayed waveguide diffraction grating wavelength splitter outputs a first set of optical signals whose wavelengths are sequentially deviated with said difference δ, and a second set of optical signals whose wavelengths are periodically deviated with said difference Δλ from the set of optical signals that are input from said fourth star coupler to said first star coupler, to respective ones of the multiple ports of said second input/output port without said first set and said second set overlapping.

3. The optical wave combining/splitting device according to claim 1, wherein said δ and said Δλ satisfy Δλ=Qδ, where Q is 2 or a greater integer.

4. The optical wave combining/splitting device according to claim 1, wherein said fourth star coupler is a star coupler of which the number of ports at said first star coupler side is Q, and said first star coupler is a star coupler of which the number of ports at said fourth star coupler side is Q, where Q is 2 or a greater integer and an integer that satisfies Δλ=Qδ for said Δλ and δ.

5. The optical wave combining/splitting device according to claim 1, wherein said wavelength difference Δλ is given by $\Delta\lambda < \lambda_0^2/(2\ n_{A2}\ \Delta L_{A2})$, where the optical path length difference between adjacent waveguides of said second arrayed waveguide is $\Delta L_{A2}$, the equivalent refractive index of said second arrayed waveguide is $n_{A2}$, and the central wavelength of the optical signals to be used is $\lambda_0$, and said δ is given by $n_{S4}\ d_4\ \Delta\theta_4/m_4$, where $n_{S4}$ is the refractive index of said fourth star coupler and where the waveguide spacing at the said fourth star coupler side of a connecting waveguide for connecting said fourth star coupler and said first star coupler is $d_4$, and the angle formed by adjacent waveguides at the said fourth star coupler side of said connecting waveguide for connecting said fourth star coupler and said first star coupler is $\Delta\theta_4$, where $m_4=2\ n_{A2}\ \Delta L_{A2}/\lambda_0$.

6. The optical wave combining/splitting device according to claim 5, wherein $\delta=n_{S1}d_1\Delta\theta_1/m_2$ is satisfied for said δ, where the refractive index of said first star coupler is $n_{S1}$, the waveguide spacing at the said first star coupler side of the said connecting waveguide is $d_1$, and the angle formed by the adjacent waveguides at the said first star coupler side of said connecting waveguide for connecting said fourth star coupler and said first star coupler is $\Delta\theta_1$, and $\Delta\lambda > n_{S2}d_2\Delta\theta_2/m_2$ is satisfied for said wavelength difference Δλ, where the refractive index of said second star coupler is $n_{S2}$, the waveguide spacing at said second star coupler side of said first arrayed waveguide is $d_2$, and the angle formed by the adjacent waveguides at the said second input/output port side of the said second star coupler is $\Delta\theta_2$, where $m_2=2\ n_{A1}\ \Delta L_{A1}/\lambda_0$ where $n_{A1}$ is the refractive index of said first arrayed waveguide and $\Delta L_{A1}$ is optical path length difference between the adjacent waveguides of said first arrayed waveguide.

7. The optical wave combining/splitting device according to claim 1, further comprising a slab waveguide connecting said fourth star coupler to said first star coupler.

8. An optical wave combining/splitting device comprising:
a first input/output port;
a period characteristic wavelength splitter that is connected to the first input/output port;
a diffraction grating wavelength splitter comprised of arrayed waveguides that is connected to the period characteristic wavelength splitter; and
a second input/output port comprised of multiple ports that is connected to the diffraction grating wavelength splitter,
wherein said diffraction grating wavelength splitter further comprises:
a first star coupler;
a first arrayed waveguide comprised of multiple waveguides having different optical path lengths; and
a second star coupler;
which are sequentially positioned from said period characteristic wavelength splitter side, and
said period characteristic wavelength splitter further comprising:
a third star coupler that is connected to said first input/output port;
a second arrayed waveguide comprised of multiple waveguides having different optical path lengths that is connected to said third star coupler; and
a fourth star coupler of which one end is connected to said second arrayed waveguide;
a slab waveguide connecting said fourth star coupler at its other end to said first star coupler, and
when optical signal is input from said first input/output point to the period characteristic wavelength splitter, separate optical signals whose wavelengths are sequentially deviated with difference δ are output from the multiple ports at said first star coupler side of said fourth star coupler, and periodic optical signals whose wavelengths differ by Δλ are output from each of the multiple ports of said first star coupler side of said fourth star coupler.

9. The optical wave combining/splitting device according to claim 8, wherein a wavelength deviation of said slab waveguide is substantially the same as said difference δ.

10. The optical wave combining/splitting device according to claim 9, wherein said wavelength deviation is given by $\delta=n_{S1}\ d_1\Delta\theta_1m_2$, where $n_{S1}$ is the refractive index of said first star coupler, $d_1$ is the waveguide spacing at said first star coupler side of said slab waveguide, $\Delta\theta_1$ is the angle formed by adjacent waveguides, and $m_2$ is an order of interferences given by $m_2=2n_{A1}\ \Delta L_{A1}/\lambda_0$, where $n_{A1}$ is the refractive index of said first arrayed waveguide and $\Delta L_{A1}$ is an optical path length difference of adjacent waveguides of said first arrayed waveguide.

* * * * *